March 29, 1966     R. BALSIGER     3,243,807
ELECTRIC CIRCUIT FOR ELIMINATING MISLEADING ELECTRIC
SIGNALS IN AN APPARATUS FOR MEASURING AND RECORDING
THE SPEED OF VEHICLES AND THE LIKE
Filed July 24, 1963
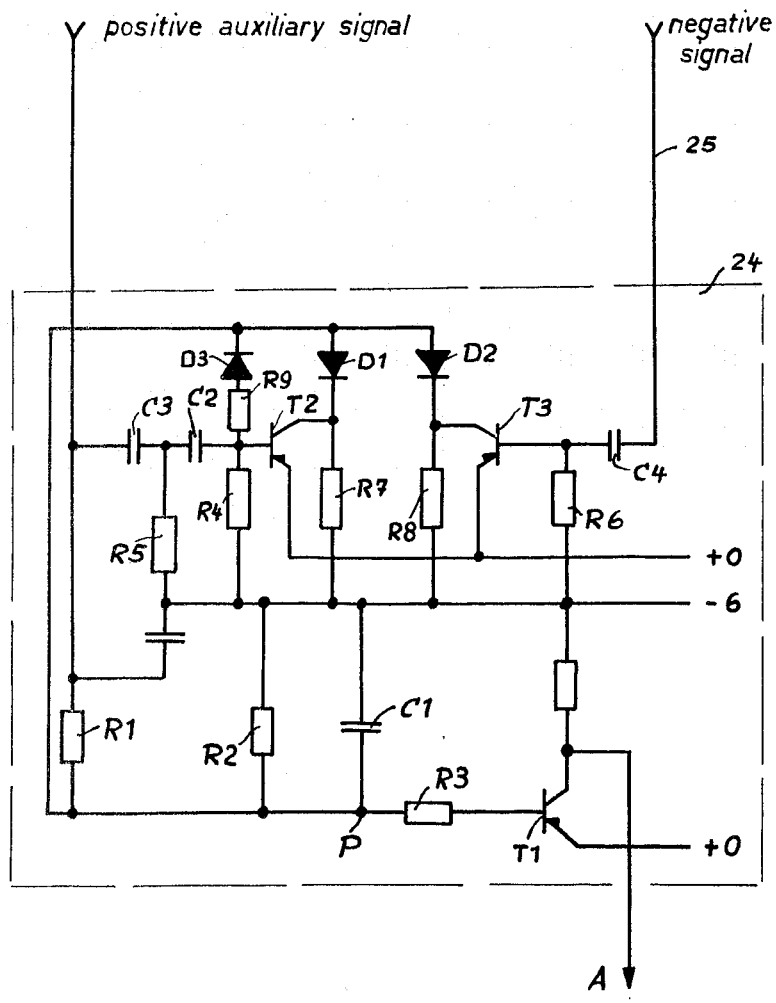
INVENTOR
Rudolf Balsiger
BY Werner W. Kleeman
His Attorney

United States Patent Office 3,243,807
Patented Mar. 29, 1966

3,243,807
ELECTRIC CIRCUIT FOR ELIMINATING MISLEADING ELECTRIC SIGNALS IN AN APPARATUS FOR MEASURING AND RECORDING THE SPEED OF VEHICLES AND THE LIKE
Rudolf Balsiger, Wabern-Bern, Switzerland, assignor to Multanova A.G., Kusnacht, Zurich, Switzerland, a corporation of Switzerland
Filed July 24, 1963, Ser. No. 297,407
Claims priority, application Switzerland, July 27, 1962, 9,022/62
8 Claims. (Cl. 343—8)

The present invention relates to an improved electric circuit for eliminating misleading electric levels or signals at an apparatus adapted for measuring and recording the speed of vehicles in conformance with the radar-Doppler principle and according to the commonly assigned, co-pending United States application Serial No. 188,768, of Max Gustav Handschin, filed April 19, 1962, for "Apparatus for Measuring and Recording the Speed of Motor Vehicles, Especially Road Vehicles," now United States Patent 3,137,538 granted June 16, 1964.

The apparatus illustrated and described in the aforementioned application and serving to check the speed of road vehicles, particularly for police ticketing or punishment when the driver exceeds a prescribed maximum speed limit, is provided with a microwave generator for feeding a parabolic antenna which transmits or delivers a directed wave packet or beam cut or intersected by a passing vehicle, wherein a portion of the waves are reflected back to the antenna. The Doppler frequencies or oscillations generated in this manner are amplified, and this signal is supplied via a first and second square-wave or rectangular generator to an integrator circuit or network which integrates the square-wave impulses into a direct current voltage level or signal which represents an exact measurement for the speed of the wave-reflecting motor vehicle. This voltage level or signal is stored by means of a storage network and thereafter is measured and indicated by a recording circuit.

A control signal is provided for controlling the storage network, for generating a starting signal for the writing means of the recording circuit and for the blocking of the first square-wave generator in order to prevent the evaluation of an electric signal or level from being influenced by further input or incoming signals, said control signal being delivered to a suitable control circuit for fulfilling the previously mentioned functions, preferably constructed as a univibrator switch or circuit.

The initiation or preparation of the storage of the voltage level by the control signal and naturally also the release or actuation of the writing means and the blocking of the aforementioned generator must, however, only then occur when sufficient assurances exist that the signal to be evaluated by storage thereof appears at the output of the integrator network as a clear and unmistakable signal, in order to prevent processing of unclear signals, thereby preventing the generation of falsified measurement results. Such unclear signals result, for example, through high disturbance frequencies which can be generated for example by vibrating chassis members, spoked wheels and the like, or by interruption of the wave reflection which is manifested in the form of voltage level fluctuations or signal oscillations.

Accordingly, the present invention has as one of its primary objects to provide an improved electric circuit by means of which there is achieved the positive and reliable elimination of misleading voltage level values or signals, so that the storage of such voltage signals or levels only occurs when such are clear and unmistakable.

Still another important object of this invention is to provide an improved electric circuit for processing voltage signals such as to positively eliminate those misleading signals which would tend to give false measurement results.

Yet a further noteworthy and prime object of the present invention is to provide an improved electric circuit wherein an output signal only then appears when an input signal remains constant at least during the period of time of the time constant of a time delay member or mechanism.

The invention teaches that the evaluation of the electric voltage level or signal is made dependent upon the expiration of the time-delay of a resettable time-delay member or mechanism whereby resetting is initiated by an alteration or changing of the voltage level or signal with time, so that the evaluation process only then occurs when the voltage level or signal has remained constant at least during the time constant of the time-delay member.

More specifically, the present invention contemplates the provision of an improved electric circuit generally characterized by the features that, at the input of an RC-member there is applied an auxiliary signal which is proportional to the voltage level or signal; that in the discharge circuit of the capacitor of the RC-member there is disposed an electric switch which is actuated upon reaching a predetermined condition of charging of the capacitor and initiates evaluation of the voltage level or signal, and further that in the charging circuit of the capacitor there are located two electronic switches connected in parallel to one another, each of which is provided with its own respective control circuit in each of which there is arranged at least one differential stage which produces a control signal when there is a change with time of the voltage level or signal, by means of which the associated switch is actuated and causes the generation of a signal which is oppositely effective to the charging current of the capacitor.

Still further objects and the entire scope of applicability of the present invention will become readily apparent from the detailed description given hereinafter, wherein in the drawing there is illustrated, by way of example and not limitation, a preferred embodiment of the electric circuit of the present invention which will now be fully described.

Describing now the single figure, it will be seen that a positive auxiliary signal is delivered to the input of an RC-member embodying a capacitor C1 and resistor R1. This positive auxiliary signal is identical to the control potential or voltage supplied from the rectifier circuit 22 to the time-delay circuit 24 depicted in FIGURE 1 of the aforementioned United States patent. In the discharge circuit of the capacitor C1 there is coupled a transistor T1 employed as an electronic switch, the base of which is connected to a negative potential of for example −6 volts through the agency of a resistor R3 and a resistor R2. On the other hand, in the charging circuit of the capacitor C1 there is arranged two parallely connected electronic switches T2 and T3 formed by suitable transistors. The base of the electronic switch T2, in this instance, is coupled to the output of a differential stage provided with a capacitor C2 and a resistor R4. This differential stage is electrically coupled in front of a further differential stage having a capacitor C3 and a resistor R5, at the input of which there is applied the positive auxiliary signal. The base of the switch T3, in turn, lies at the output of a differential stage provided with a capacitor C4 and a resistor R6, such differential stage having supplied thereto the negative voltage level or signal which, for example, is identical to the voltage level or signal supplied to the time-delay circuit 24 via the conductor 25 of FIGURE 1 of the aforementioned United States patent.

In the rest condition of the aforedescribed circuit arrangement during which time no reflection of the bundle of radar waves delivered by the parabolic antenna occurs, and thus during which time also no auxiliary signal proportional to the voltage level or signal appears at the input of the RC-member, the switch T1 is initially conductive whereby its collector potential, in the illustrated embodiment, is biased to approximately −0.2 volts. On the other hand, the capacitor C1 exhibits a voltage of approximately 5.6 volts due to the voltage ratio of the resistors, namely resistor R1 parallel to resistor R3, with such resistors being connected in series with resistor R2.

Now, if radar beam reflections appear at the parabolic antenna there results an increase of the voltage level or signal and therewith also a proportional increase of the positive auxiliary signal. This increase of the potential is differentiated via the differential stages provided with the capacitors C2 and C3, whereby the transistor T2 is blocked and the charging circuit of the capacitor C1 has applied to it a negative potential via a resistor R7 and a diode D1 which opposes the positive auxiliary signal so that the transistor T1 is further conductive.

If the positive auxiliary signal has reached a constant value then the capacitor C1 will become more positively charged due to displacement of the potential at point P, whereupon, after expiration of the time constant or time-delay of the RC-member, determined by the constants of the resistor R1 and capacitor C1, the transistor T1 is blocked, and at the output A of the electric circuit there appears the control signal motivating or influencing the storage of the voltage level or signal.

If, however, there occurs within the period of the time-delay of the RC-member a renewed voltage level increase, and therewith, an increase of the positive auxiliary signal, then there occurs a renewed differentiation via the differentiating stages provided with the capacitors C2 and C3, whereupon, as described, the charging circuit of the capacitor C1 has applied to it a potential working opposite or against the auxiliary signal, and the time-delay member formed by the resistor R1 and capacitor C1 is reset so that the transistor T1 is further conductive and such blocks the output signal of the circuit. On the other hand, if there occurs a voltage level drop then this drop is differentiated via the differentiation stage provided with the capacitor C4 and the resistor R6, whereby the transistor T3 is blocked and the charging circuit of the capacitor C1 has likewise supplied thereto a potential working opposite or against the auxiliary signal via a resistor R8 and a diode D2, which again results in a resetting of the time-delay member, as aforedescribed.

This electric circuit thereby renders it possible that the control signal causing processing or storage of the voltage level or signal only then appears at the output A of the circuit, which control signal in accordance with the herein-mentioned commonly assigned, United States patent is supplied to the therein described univibrator 28, when the voltage level or signal to be stored has remained constant at least during the period of time-delay of the time-delay member or mechanism. A voltage-dependent member which is formed by a resistor R9 and a diode D3 thereby has the effect that the time-delay of the RC-member remains approximately constant also with high potentials of the auxiliary signal.

While there is shown and described a present preferred embodiment of the invention, it is to be distinctly understood that the invention is not limited thereto but may be otherwise variously embodied and practised within the scope of the following claims.

Having thus described the present invention, what is desired to be secured by United States Letters Patent, is:

1. Circuit arrangement for eliminating misleading electric signals at an apparatus for measuring and recording the speed of moving objects, particularly motor vehicles and the like according to the radar-Doppler principle wherein a radar beam is transmitted and reflected upon encountering an object to produce an electric signal indicative of the speed of movement of the encountered beam-reflecting object, comprising an RC-member, means for applying an auxiliary signal proportional to the electric signal to the input of said RC-member, said RC-member including a charging and discharging circuit for its capacitor, an electronic switch arranged in the discharge circuit of said capacitor operable when said capacitor has reached a predetermined condition of charging and causes evaluation of the electric signal, a pair of electronic switches coupled in the charging circuit of said capacitor, a control circuit for each electronic switch of said charging circuit, at each of which control circuit there is provided at least one differentiating stage, said respective differentiating stages generating a control signal when there occurs a change of the electric signal with time, by means of which the associated electronic switch is actuated and causes the generation of a signal which works opposite to the charging current of the capacitor.

2. Circuit arrangement for eliminating misleading electric signals at an apparatus for measuring and recording the speed of moving objects, particularly motor vehicles and the like according to the radar-Doppler principle wherein a radar beam is transmitted and reflected upon encountering an object to produce an electric signal indicative of the speed of movement of the encountered beam-reflecting object, comprising an RC-member, means for applying an auxiliary signal proportional to the electric signal to the input of said RC-member, said RC-member including a charging and discharging circuit for its capacitor, an electronic switch arranged in the discharge circuit of said capacitor actuated when said capacitor has reached a predetermined condition of charging and causes evaluation of the electric signal, a pair of parallely arranged electronic switches electrically coupled in the charging circuit of said capacitor, a separate control circuit for each electronic switch of said charging circuit, at each of which control cicuit there is provided at least one differentiating stage, said respective differentiating stages generating a control signal when there occurs a change of the electric signal with time, by means of which the associated electronic switch is actuated and causes the generation of a signal which works opposite to the charging current of the capacitor.

3. Circuit arrangement according to claim 2 wherein at the input of the differentiating stage controlling one of the electronic switches there is applied the electric signal and at the input of the differentiating stage controlling the other electronic switch there is applied the auxiliary signal.

4. Circuit arrangement according to claim 2 wherein said electronic switches comprise transistor means.

5. In the art of measuring and recording the speed of moving objects, particularly motor vehicles according to the radar-Doppler principle wherein a radar beam is transmitted and reflected upon encountering an object to produce an electric signal indicative of the speed of movement of the encountered beam-reflecting object, a circuit arrangement for eliminating misleading electric signals which comprises: a time-delay circuit including a time-delay mechanism, means for supplying an electric signal indicative of the speed of movement of an encountered beam-reflecting object to said time-delay circuit, means for examining said electric signal to determine if it remains constant at least during the time-constant of said time-delay mechanism, and means for motivating evaluation of said electric signal only then if it remains constant at least during the period of time of the time-constant of said time-delay mechanism.

6. In the art of measuring and recording the speed of moving objects, particularly motor vehicles according to the radar-Doppler principle wherein a radar beam is transmitted and reflected upon encountering an object to produce an electric signal indicative of the speed of movement of the encountered beam-reflecting object, a circuit arrangement for eliminating misleading electric signals which comprises: a time-delay circuit including a resettable time-delay mechanism, means for supplying an electric signal indicative of the speed of movement of an encountered beam-reflecting object to said time-delay circuit, means for examining said electric signal to determine if it remains constant at least during the time-delay of said time-delay mechanism, means for resetting said resettable time-delay mechanism if there occurs a change of said electric signal with time, and means for motivating evaluation of said electric signal only then if it remains constant at least during the period of time of the time-delay of said time-delay mechanism.

7. In the art of measuring and recording the speed of moving objects, particularly motor vehicles according to the radar-Doppler principle wherein a radar beam is transmitted and reflected upon encountering an object to produce an electric signal indicative of the speed of movement of the encountered beam-reflecting object and an auxiliary signal proportional to said electric signal to said time-delay circuit, said auxiliary signal being applied to the input of said resettable time-delay mechanism, means for examining said electric signal and its proportional auxiliary signal in order to determine if they remain constant at least during the time-constant of said time-delay mechanism, means for resetting said resettable time-delay mechanism by means of said auxiliary signal if there occurs a change of said electric signal with time, and means for motivating evaluation of said electric signal if it remains constant at least during the period of time of the time-constant of said time-delay mechanism.

8. Circuit arrangement for eliminating misleading electric level values at an apparatus for measuring and recording the speed of motor vehicles and the like according to the radar-Doppler principle, said circuit arrangement comprising: a resettable time-delay mechanism, means cooperating with said resettable time-delay mechanism for delivering an evaluation initiating control signal after expiration of the time-delay of said resettable time-delay mechanism, and means for resetting said time-delay mechanism before expiration of the time-delay when there occurs a change of the electric level as a function of time.

No references cited.

CHESTER L. JUSTUS, *Primary Examiner.*

R. D. BENNETT, *Assistant Examiner.*